United States Patent
Iftime et al.

(10) Patent No.: US 7,641,120 B2
(45) Date of Patent: Jan. 5, 2010

(54) SYSTEM FOR EMBEDDING MACHINE-READABLE INFORMATION WITH FLUORESCENT MATERIALS

(75) Inventors: Gabriel Iftime, Mississauga (CA); Peter M. Kazmaier, Mississauga (CA); Paul F. Smith, Oakville (CA); Christopher A. Wagner, Etobicoke (CA); Peter G. Odell, Mississauga (CA); Jennifer L. Belelie, Oakville (CA); Naveen Chopra, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/434,962

(22) Filed: May 4, 2009

(65) Prior Publication Data

US 2009/0212115 A1 Aug. 27, 2009

Related U.S. Application Data

(62) Division of application No. 11/554,871, filed on Oct. 31, 2006, now Pat. No. 7,549,592.

(51) Int. Cl.
*G06K 19/06* (2006.01)
(52) U.S. Cl. .................. 235/491; 235/468; 235/487
(58) Field of Classification Search .................. 235/468, 235/487, 491
See application file for complete search history.

(56) References Cited

U.S. PATENT DOCUMENTS

| | | | |
|---|---|---|---|
| 5,122,187 A | 6/1992 | Schwarz et al. | |
| 5,128,525 A | 7/1992 | Stearns et al. | |
| 5,168,147 A | 12/1992 | Bloomberg | |
| 5,710,420 A | 1/1998 | Martin et al. | |
| 5,946,414 A | 8/1999 | Cass et al. | |
| 6,906,118 B2 | 6/2005 | Goodbrand et al. | |
| 6,970,259 B1 | 11/2005 | Lunt et al. | |
| 7,229,025 B2 * | 6/2007 | Sussmeier et al. | 235/494 |
| 2005/0087605 A1 * | 4/2005 | Auslander et al. | 235/491 |
| 2007/0119951 A1 | 5/2007 | Auslander et al. | |
| 2008/0087190 A1 | 4/2008 | Iftime et al. | |

FOREIGN PATENT DOCUMENTS

| | | |
|---|---|---|
| DE | 4020578 A1 | 2/1991 |
| DE | 19753118 A1 | 8/1999 |
| GB | 2233282 | 1/1991 |
| GB | 2234712 | 2/1991 |

OTHER PUBLICATIONS

Fleet et al.; "Embedding Invisible Information in Color Images"; IEEE International Conference; vol. 1; pp. 532-535; Oct. 1997.

* cited by examiner

*Primary Examiner*—Michael G Lee
*Assistant Examiner*—Rafferty Kelly
(74) *Attorney, Agent, or Firm*—Oliff & Berridge, PLC

(57) ABSTRACT

Disclosed is a system for embedding and recovering machine readable information on a substrate, including an image forming device containing at least two fluorescent marking materials, wherein the image forming device receives data representative of the machine readable information, and forms an image corresponding to the data in a machine readable code format with the at least two fluorescent marking materials on the substrate, and a document reading device including a radiation emitting unit that emits radiation effecting fluorescence of a first fluorescent marking material and/or second fluorescent marking material, and a reader that detects the data in the image on the image receiving substrate while the first fluorescent marking material and/or second fluorescent marking material is fluorescing.

8 Claims, 3 Drawing Sheets

SYSTEM FOR EMBEDDING MACHINE-READABLE INFORMATION WITH FLUORESCENT MATERIALS

CROSS-REFERENCE TO RELATED APPLICATION

This is a Division of application Ser. No. 11/554,871, filed Oct. 31, 2006. The disclosure of the prior application is hereby incorporated by reference herein in its entirety.

BACKGROUND

Described herein is a process and code system for embedding machine readable information on an object. The code is binary based, and uses different shapes and/or colors to encode the information. The code may be formed using fluorescent marking materials such as fluorescent inks or toners.

For example, described is a process for printing machine readable information with fluorescent marking materials that can, by irradiation with radiation of an appropriate wavelength, be made to fluoresce to either be rendered visible or to be rendered to have a different color or appearance from the marking material in ambient light, in a reversible process. Also described are information embedding code systems comprised of dots or glyphs fluorescing with different colors, substrates having information embedded thereon using the fluorescent marking materials, and systems for imprinting and reading the embedded information.

A number of advantages are associated with the various embodiments described herein. For example, where the fluorescent materials are colorless in normal room light (ambient light) conditions, the machine readable or encrypted information is invisible. The information is thus hidden until exposed to radiation such as UV light that causes the fluorescent materials to fluoresce. Another advantage is that the encrypted information, in the form of, for example, dots or glyphs, can not be copied with existing photocopiers. A further advantage is that where dots are used to encrypt the information, the amount of information that can be encrypted increases significantly because the number of dots that may be printed on the same page is much higher when compared with glyphs, and the size of the dots may be significantly decreased by using an emissive (fluorescent) technology rather than a reflective technology.

U.S. Pat. No. 5,710,420, incorporated herein by reference in its entirety, describes a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state. Use of a photochromic marking material, which is a reflective technology, is thus described.

While known compositions and processes are suitable for their intended purposes, a need remains for additional systems and processes for embedding and recovering machine readable information on an object. Further, there is a need for systems and processes which enable the placement of encoded information on documents which is not detectable to a human viewer but which is machine readable. Additionally, there is a need for systems of encoding machine readable information so that larger amounts of such information may be stored, and thus where the amount of overdetermination built into the stored information may be increased.

SUMMARY

These and other objects may be achieved herein by providing a method of embedding information on a substrate, comprising converting the information to machine readable code format, and writing the machine readable code format on the substrate with at least one fluorescent marking material.

Also provided is a method of embedding and recovering information on a substrate, comprising forming a machine readable code format on the substrate with at least one fluorescent marking material, and thereafter exposing the machine readable code format to a radiation effecting fluorescence of the at least one fluorescent marking material, and reading the machine readable code format while the at least one fluorescent marking material is fluorescing.

Still further provided is a system for embedding and recovering machine readable information on a substrate, comprising an image forming device containing at least one fluorescent marking material, wherein the image forming device receives data representative of the machine readable information, and forms an image corresponding to the data in a machine readable code format with the at least one fluorescent marking material on an image receiving substrate, and a document reading device including a radiation emitting unit that emits radiation effecting fluorescence of the at least one fluorescent marking material, and a reader that detects the data in the image on the mage receiving substrate while the at least one fluorescent marking material is fluorescing.

EMBODIMENTS

In embodiments, described is a method of writing data in a predetermined machine readable code format on a substrate with a marking material. As the marking material, any suitable marking material, including for example inks, toners and the like, may be used. The marking material may be a conventional marking material, for example a marking material that exhibits a visible color. In embodiments, the marking material is a fluorescent marking material.

The code format will first be discussed. Any suitable or desired machine readable code format may be selected, including one-dimensional symbologies such as bar codes, two-dimensional symbologies such as stacked bar codes, matrix codes, codes such as PDF417, and the like.

In embodiments, the code format is comprised of a self-clocking glyph code as disclosed in, for example, U.S. Pat. Nos. 5,128,525 and 5,168,147, the disclosures of each of which are totally incorporated herein by reference. In one embodiment, this code comprises printed glyphs which represent 0 and 1 bits in a document encoding scheme. The glyphs are printed at a substantially uniform distance from each other, so that the center of each glyph is a substantially uniform distance from the center of adjacent glyph(s). The visual appearance of the marks, to the naked eye, may appear as a textured grayish area. These marks can be printed at very high densities of, for example, about 3,600 data bits per square inch or higher, and scanned with a 300 pixel per inch scanner. Data is encoded by the shape or the rotational orientation of the mark. Clocking can be taken from the data itself, without synchronization marks external to the data. By placing a mark at each data bit position, it is easier to synchronize the reading process of the data without the use of registration marks. The number of bits that can be represented by each symbol is related to the total number of symbols in the code; when the number of bits to be represented by a symbol is "n", the total number of glyphs possible in the code is $2^n$ distinctive glyphs. For example, in a code wherein two distinct glyphs are possible, such as / and \, each symbol may represent one bit; for example, /=1 and \=0. In a code wherein four distinct glyphs are possible, such as /, -, \, and |, each symbol can represent two bits; for example, /=00, |=01, \=10, and -=11. In a code wherein eight distinct glyphs are possible, each symbol can represent three bits, and the like. Data can be encoded in the shape of the glyphs, the rotation of the glyphs, or in any other desired variation.

Figure 1:
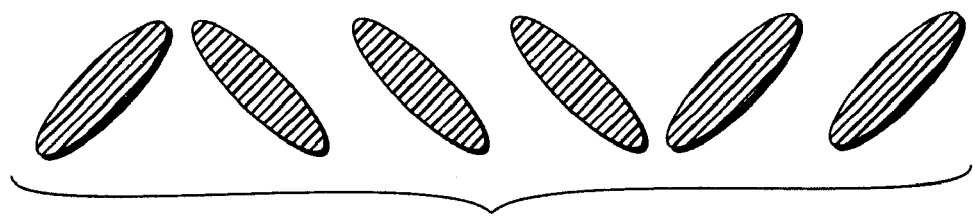
FIG. 1 is an example of machine-readable glyph code suitable for use in embodiments described herein.

In embodiments, the glyphs are elliptical marks, and in a simple code wherein two distinct shapes are possible, the glyphs preferably are elliptical marks rotated from the vertical at either about +45° (for example, "/") or −45° (for example "\"). An example of a typical encoding sequence in this embodiment is shown in FIG. 1, wherein, for example, the first, fifth and sixth glyphs represent 1s and the second, third and fourth glyphs represent 0s. The use of orthogonally-oriented marks potentially allows for a large degree of discrimination between data bit 1 and data bit 0. The marks may be inclined at about 45°, rather than being horizontal or vertical, because (a) there is less tendency for adjacent marks to touch, (b) the eye is less sensitive to diagonal lines than to vertical or horizontal lines, and (c) printing and scanning non-uniformities tend to be horizontal (banding) or vertical (photodetector array response variations). In an embodiment, the two glyphs may each be elongated multi-pixel symbols having the same number of adjacent "ON" pixels and differ from each other in their rotation from the vertical. These specific glyphs are readily discernible from each other, even in the presence of significant distortion and image degradation, because they do not tend to degrade into a common shape. In addition, since all of the glyphs have the same number of "ON" pixels, the printed glyph code has a generally uniform texture, which will take the form of a gray scale appearance when higher density glyphs are viewed by a casual observer.

As will be discussed below, where the glyphs are formed of a single color, the glyphs are formed using a fluorescent marking material.

In embodiments, the code is comprised of at least two differently colored marks. The marks may be the same or different in shape. The different colors are capable of being separately detected by a reader such as a spectrophotometer. Any reader capable of detecting different colors based on absorption, emission or reflection spectroscopy may be used. The reader understands the different colors as representing different data, for example understanding 0s as one emitted color (for example red) and 1s as another emitted color (for example blue), which allows the code to encrypt binary code. Any two or more distinguishable colors may be used, for example at least red and blue, at least red and green, at least green and blue, and the like. The different colors may also be different shades of a same color, including similar colors exhibiting a distinguishable appearance due to different fluorescence upon exposure to radiation, for example a different brightness.

The marks may be glyphs, as discussed above, or dots and the like. Dots refer to, for example, any mark of any shape, and includes, for example, circular or rectangular marks.

With dots, 0s and 1s are provided by dots that exhibit and/or emit different colors under the conditions under which the reading occurs. For example, two differently colored marking materials visible under ambient light conditions may be used. Further, fluorescent marking materials that are either visible or invisible under ambient light but that emit two different colors upon exposure to radiation such as UV light may also be used.

Figure 2:
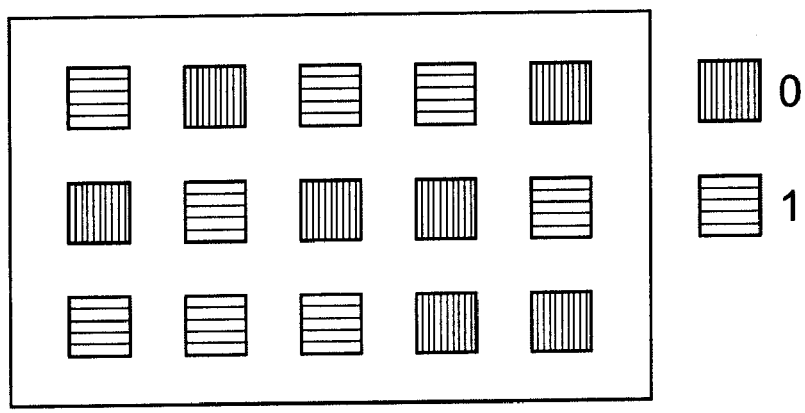
FIG. 2 is an example of machine-readable code using two different colors.

FIG. 2 illustrates code using dots of two different colors, with red colored dots representing 0s and blue colored dots representing 1s.

Figure 3:
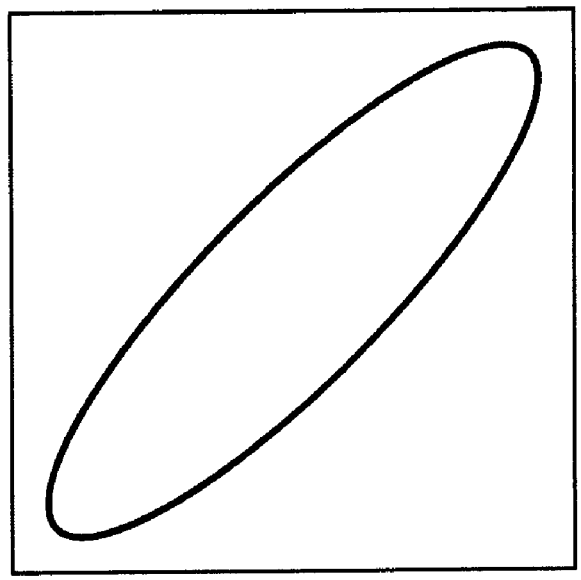
FIG. 3 illustrates a space occupied by a glyph code mark at a given resolution.
Figure 4:
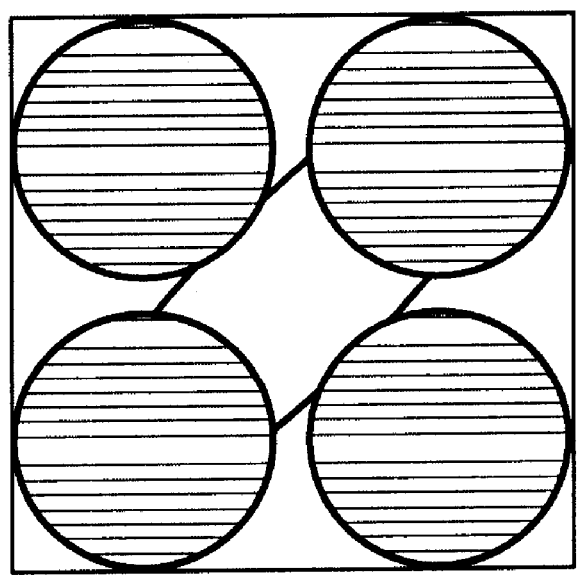
FIG. 4 illustrates a comparison of space occupied by dots as compared to a glyph code mark at a given resolution.

An advantage of the use of colored marks such as colored dots is that with conventional glyphs, the amount of encrypted information is limited by the size of the glyphs. Glyphs typically occupy a square on the surface of a substrate as shown in FIG. 3. If the same square was to be occupied by colored dots that have a diameter about equal to the width of the glyphs, which would require no need to change the resolution in forming the code, at least four or five dots may be included in the same space occupied by the glyph. See FIG. 4, illustrating four dots overlaid in the same space occupied by a single glyph. Compared to glyphs formed on a substrate using a same device, the number of bits of information may be increased by at least four times without increasing the resolution of the device forming the code on the substrate. As a result, the amount of information is increased significantly in a document made using colored dots instead of glyphs. Additional gains in information capability may be realized by making the dots even smaller. The dots may be of a size ranging from about 0.1 microns to about 1,000 microns, for example from about 10 microns to about 100 microns and more preferably from about 40 microns to about 100 microns.

The glyphs and dots can be decoded by any suitable or desired method. For example, for glyphs, bitmap images of the glyphs can be processed even when image distortion or degradation has occurred by, for example, facsimile transmission, scanning of photocopies, or the like. In certain decoders, the image processing which is performed for decoding the glyph codes first locates the glyphs in the X-Y coordinates of the bitmap image space, then constructs a table for indexing the glyphs in the spatial order in which data was encoded in them, and then analyzes the glyphs in indexed order for sequentially extracting the data values encoded therein. In other decoders, the image processing classifies the glyphs by their shapes while concurrently locating their centers in the bitmap image space, so the decoded values of the glyphs conveniently are indexed to the bitmap image space. These spatially indexed decoded data values may be sorted in accordance with the spatial template or pattern that governs their spatial ordering if it is desired to restore their serial order in the time domain. Similar methods may be used with dots, with the decoding being based on the different color detection rather than solely on glyph orientation.

The code, whether glyphs or dots, may be printed onto an image, or may be printed onto a blank portion of a substrate free of other images. In embodiments where fluorescent marking materials are used to form the code, and in particular colorless fluorescent marking materials are used to form the code, the code may be located exclusively on an image portion of the substrate. For example, where the image is comprised of text, the code may be overprinted onto the letters of the text. This way, the code will be completely hidden from a viewer in normal room light (with no chance of potentially visible traces of colorless ink being noticed in non-image areas, for example due to differential gloss or darkening of the substrate by the ink), and would be apparent only under radiation such as UV light that causes fluorescence of the fluorescent material.

The marking materials for forming the code on a substrate will now be described.

In embodiments, the code, including glyphs or dots, are formed using a fluorescent marking material. The fluorescent marking material may either be made to not contain any visible colorant so as to be a colorless marking material in normal room/ambient light conditions, or it may include visible colorants wherein upon fluorescence a visible change in appearance, for example in color or brightness, occurs. An advantage in forming the glyphs or dots with colorless fluorescent marking materials is that the information can be made to be invisible in ambient light, and becomes visible and machine readable only upon exposure to radiation such as UV light at which the fluorescent marking material fluoresces. In this way, persons other than those authorized are likely to be unaware of the presence of the encrypted information therein, which could thus be a valuable tool in preventing or detecting counterfeiting. Another advantage is that the glyphs or dots may be made to have an appearance other than gray as with conventional glyphs. A still further advantage is that the glyphs or dots cannot be copied with existing photocopiers that are not capable of reproducing the fluorescence property.

In embodiments where the code is comprised of glyphs, a single fluorescent marking material may be used to form the glyphs. The single fluorescent marking material may contain substantially no colorant so as to be substantially not visible on the substrate under normal ambient light, but contain at least one fluorescent material so that upon exposure to radiation effecting fluorescence of the at least one fluorescent material, the fluorescent marking material exhibits a visible color. In this way, the glyph code only appears upon exposure to radiation that causes fluorescence of the marking material, which fluorescence can be detected by the reader. It is also acceptable to employ a fluorescent marking material that includes a colorant in addition to the fluorescent material.

When the glyphs or dots are formed using fluorescent marking materials, the reader is equipped with a radiation source such as a UV light source that will cause fluorescence of the fluorescent marking material. The reader can then detect and read the information. In this regard, the encryption and reading is based on the use of an emissive technology, namely the fluorescent marking materials, rather than on reflective technology as when conventional marking materials are used.

In further embodiments, the fluorescent marking material is comprised of at least two fluorescent marking materials, a first fluorescent marking material containing a first fluorescent material so that upon exposure to radiation effecting fluorescence of the first fluorescent material, the first fluorescent marking material exhibits a first visible color, and a second fluorescent marking material containing a second fluorescent material so that upon exposure to radiation effecting fluorescence of the second fluorescent material, the second fluorescent marking material exhibits a second visible color different from the first visible color. The first and second fluorescent materials desirably fluoresce upon exposure to a same radiation, although such is not required.

In embodiments, the at least two different fluorescent marking materials emit different colors that can be differentially detected by a reader such as a spectrometer. The code format can thus encrypt binary code via use of the differently emitting colors. An example of code format based solely on the use of marking materials that show or emit different colors is shown in FIG. 2.

Additional advantages associated with the use of two different fluorescent marking materials that exhibit a different appearance upon fluorescence, for example such as a different color or a different brightness, include the ability to form invisible glyphs, and thus formation of an image with a nicer appearance when compared with gray areas obtained with conventional glyphs.

A further advantage associated with using two different color emitting glyphs or dots formed using fluorescent marking materials is that the dots and/or glyphs cannot be photocopied with conventional photocopiers, as discussed above.

Figure 5:
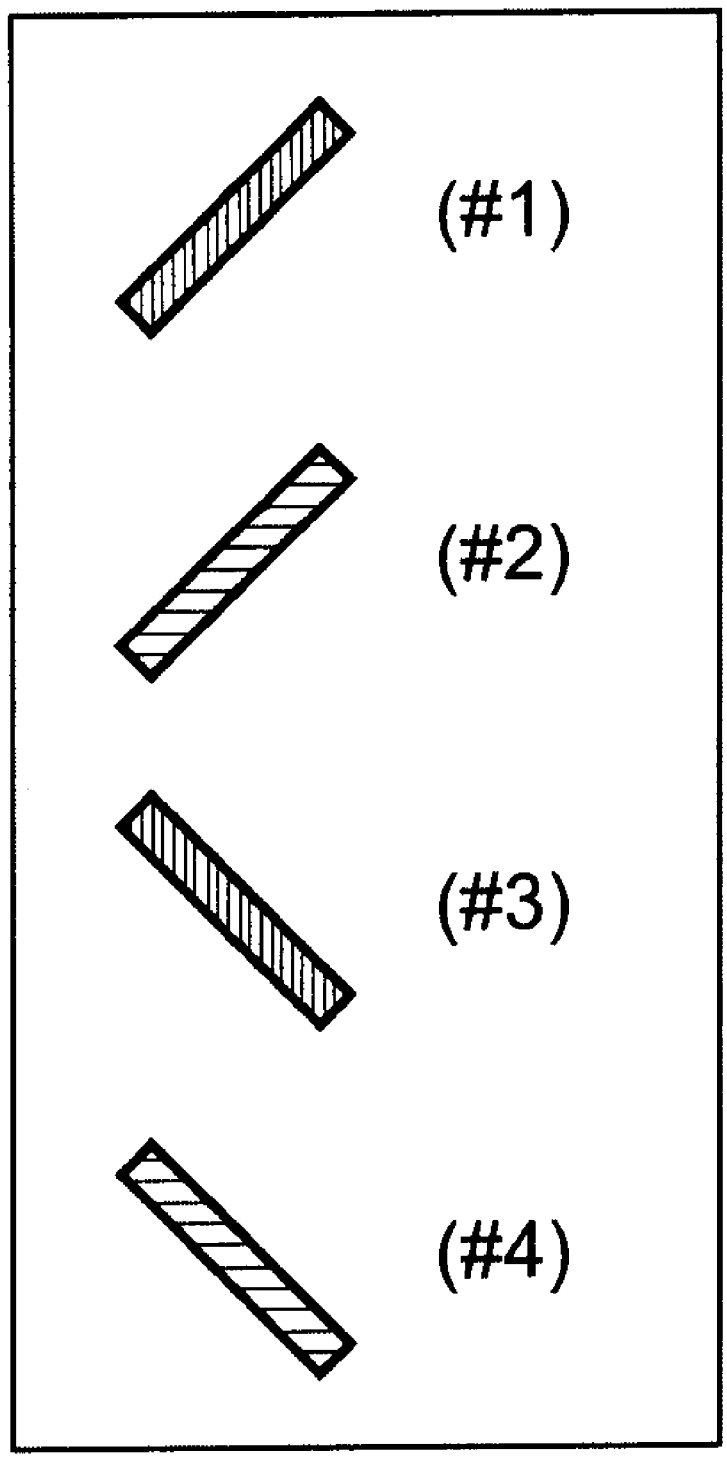
FIG. 5 is an example of a machine-readable code format using both different glyph orientations and different colors.

By employing two different fluorescent marking materials, whether a colorant is included in one or both of the fluorescent marking materials or not, an advantage is that the capacity for encrypting and storing information can be significantly increased. For example, glyphs formed with two different color emitting fluorescent marking materials permits the use of two mechanisms for encryption. First is the glyph orientation (for example, left or right) discussed above. Second is the two different colors of the glyphs, as described above. This provides for four different states that may be used as a mechanism of encrypting more information on the same surface of a substrate. With conventional one-color glyphs, one uses only the first mechanism (glyphs orientation), which provides only two states. An example is indicated in FIG. 5, where the four states achievable when using two differently colored fluorescent marking materials to form the glyphs may be as follows: #1: oriented right/red emitted color (binary code: 00), #2: oriented right/blue emitted color (binary code 01), #3: oriented left/red emitted color (binary code 10) and #4: oriented left/blue emitted color (binary code 11). Thus, in embodiments, the machine readable code format comprises a set of four glyphs, wherein each glyph corresponds to a different digital value selected from the group consisting of 00, 01, 10 and 11, and wherein the four glyphs comprise a first glyph having an elongated along axis tilted at an angle of plus about 45° with respect to a horizontal axis and formed by the first fluorescent marking material, a second glyph having an elongated along axis tilted at an angle of plus about 45° with respect to a horizontal axis and formed by the second fluorescent marking material, a third glyph having an elongated along axis tilted at an angle of minus about 45° with respect to a horizontal axis and formed by the first fluorescent marking material, and a fourth glyph having an elongated along axis tilted at an angle of minus about 45° with respect to a horizontal axis and formed by the second fluorescent marking material.

Moreover, when using differently colored or different color emitting glyphs or dots to store information, a significant increase of the amount of information which may be encrypted may be realized. This is beneficial not only with respect to the amount of information that may be stored, but also with respect to recovering the information in damaged documents. That is, in recovering information from damaged documents, there is a significantly higher proportion of the document that can be recovered when compared with current glyph technology, for example because the dots and/or glyphs overall permit a larger amount of information to be stored via encryption, and thus the amount of duplicate information (overprotection) written into the document can be increased compared with conventional one-color glyphs. For example, there is a tradeoff between how much data is stored and the amount of overdetermination that is built into the stored data. At present, the overdetermination of data is typically set at about 10%, and data recovery may fail if more than about 10% of the document is damaged. This is due to the fact that only a limited amount of information can be encrypted with current one-color and non-emissive glyphs. Using differently colored or different color emitting glyphs or dots, whether permanently colored or invisible fluorescent, increases the amount of encrypted information, which allows for recovering data that is damaged to a larger percent than 10%. This percentage is greater when using dots as compared to glyphs, again due to the fact that more dots may be contained in the same space occupied by glyphs, at the same resolution.

The above advantages, except for being able to form dots or glyphs that are invisible under ambient light and for photocopy protection, can also be achieved when using two differently colored conventional (non-fluorescent) marking materials to form the encrypted information.

When codes are printed with conventional marking materials, at least a portion of the printed document is permanently printed with what appears to be a relatively uniformly-textured gray scale image. When large amounts of information are present, an entire printed document may be covered with glyphs that form a background upon which an image or information intended to be read by the naked eye is formed. The use of fluorescent marking materials in embodiments herein enables the generation of codes in patterns that are capable of being rendered visible or invisible by effecting a change, such as by irradiation of part or all of the glyph pattern with radiation of a wavelength that effects fluorescence in the fluorescent marking materials used to form the code. Thus, the code pattern or carpet may be rendered invisible unless or until needed for machine reading, thereby further improving the appearance of the document.

When forming differently colored glyphs or dots using non-fluorescent marking materials, any conventional marking materials, inclusive of inks and toners, may be used. Examples of suitable marking materials include inks, including lithographic and flexographic inks, aqueous inks, including those suitable for use with ink jet printing processes, liquid and dry toner materials suitable for use in electrostatic imaging processes, solid hot melt inks, including those suitable for use with ink jet printing processes, and the like. Such conventional marking materials typically comprise at least a vehicle with a colorant such as pigment, dye, mixtures of pigments, mixtures of dyes, or mixtures of pigments and dyes, therein. The (non-fluorescent) colorant may be present in a colored marking material in any desired amount, for example from about 0.5 to about 75% by weight of the marking material, for example from about 1 to about 50% or from about 1 to about 25%, by weight of the marking material.

As colorants, examples may include any dye or pigment capable of being dispersed or dissolved in the vehicle. Examples of suitable pigments include, for example, PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

In embodiments, the code is formed using at least one fluorescent marking material. The fluorescent marking material may comprise any material suitable for generating images on a selected substrate and containing a fluorescent material. Examples of suitable fluorescent marking materials include inks, including lithographic and flexographic inks, aqueous inks, including those suitable for use with ink jet printing processes, liquid and dry toner materials suitable for use in electrostatic imaging processes, solid hot melt inks, including those suitable for use with ink jet printing processes, and the like.

The fluorescent marking materials typically comprise at least a marking material vehicle with at least one fluorescent material therein. The fluorescent material may be present in the fluorescent marking material in any desired amount, and desirably present in an amount effective to impart a desired color and intensity (for example, fluorescence) under the appropriate light (for example, UV light) conditions. For example, the fluorescent marking material is present in the marking material in an amount of from about 0.1 to about 25% by weight, such as from about 0.5 to about 20% by weight or from about 1 to about 15% by weight, of the fluorescent marking material.

The fluorescent marking materials may also optionally comprise any of the colorants, in the amounts, described above. Further, the fluorescent marking materials may also include a wax and/or other conventional additives such as flow aids, charge additives, drying aids, and the like.

Thus, the fluorescent marking materials may include the fluorescent material in a colored marking material or in a substantially colorless marking material. Also, the fluorescent material may itself exhibit a visible color under ambient light conditions, and fluoresces a different color or the same color when exposed to activating radiation.

When the fluorescent material is included in a colored marking material, the fluorescent material should noticeably alter the appearance of the printed code upon exposure to activating radiation. In ambient light, the printed code will exhibit the intended color of the colorant in the colored marking material. However, upon exposure to the radiation, fluorescence of the fluorescent material in the marking material visibly changes the appearance of the printed code. For example, a yellow fluorescent marking material exhibits the intended yellow color in ambient light, but upon exposure to activating radiation, the fluorescence of the fluorescent material may change the color exhibited to a different color, for example to a red or blue color.

The above feature can be beneficial in making it difficult for encrypted information to be decoded by unauthorized persons. For example, non-fluorescing 'dummy' code symbols may be interspersed into the printed code. Because these symbols would not fluoresce during reading, the reader would not see these symbols. Instead, the reader would read only the fluorescing symbols, and thus would correctly decode the encrypted information. Someone trying to decode the information based on reading the printed symbols in ambient light conditions would not be able to correctly decode the encrypted information. Moreover, someone copying the document and/or code would also not be able to reproduce the code correctly, as the person would not know that only certain ones of the code are made to fluoresce when exposed to activating radiation.

When the fluorescent material is included in a marking material that does not include a colorant therein, the printed code is not visible or apparent to a viewer in ambient light. Upon exposure to radiation, the fluorescence of the fluorescent material causes the ink to become visible. Again, advantages of including a fluorescent material in a substantially colorless marking material include being able to form code that is invisible in ambient light, but which can be made to appear upon exposure to activating radiation. The code thus will not be capable of being photocopied. This is because the fluorescent material does not fluoresce under existing copying conditions, and thus will not appear in a copy. Moreover, the copier will not contain any ink with fluorescent material, so that the copy will not fluoresce at all. Such a feature is advantageous in that authentication is possible because falsified copies cannot be made to include the fluorescent property. Also, this feature permits one to intentionally embed hidden information in documents, which information is only revealed to one knowing to expose the document to activating radiation.

Fluorescent, or fluorescent marking material, refers to, for example, the capability of a material to fluoresce upon exposure to an activating radiation, for example a radiation having a wavelength from about 10 nm n to about 800 nm, such as from about 10 nm to about 400 nm (the UV light range) or from about 20 nm to about 380 nm. The activating radiation may thus be in the ultraviolet (UV), visible or infrared regions, although the use of activating radiation in the UV region (from about 10 nm to about 400 nm) is most common. The fluorescing may occur instantaneously on exposure to the activating radiation, or may occur after overcoming any activation phase. The fluorescing exhibited by the fluorescent ink is reversible, but should last for a time period permitting the color change or image appearance change to be detected, for example a time frame of from about 0.1 seconds to about 1 hour, such as from about 0.5 seconds to about 30 minutes or from about 0.5 seconds to about 5 minutes.

Suitable fluorescent materials include, for example, fluorescent dyes, fluorescent pigments and inorganic quantum nanoparticle materials. Examples of fluorescent dyes include those belonging to dye families such as rhodamines, fluoresciens, coumarins, napthalimides, benzoxanthenes, acridines, azos, mixtures thereof and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightner 61, mixtures thereof and the like. Other suitable fluorescent dyes include oil and solvent based dyes such as DFSB class, DFPD class, DFSB-K class available from Risk Reactor. Suitable fluorescent pigments include, for example, those available from Day-Glo Color Corp., such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, such as PFC-03, which switches from invisible to red when exposed to UV light, and PF class such as PF-09, which switches from invisible to violet when exposed to UV light. Other suppliers of fluorescent materials include Beaver Luminescers and Cleveland Pigment & Color Co.

Suitable colored fluorescent materials, which are colored in ambient light and which fluoresce when exposed to the activating energy, include for example dyes such as DFWB-K41-80 that is red in ambient light and that fluoresces red-purple under UV light and DFSB-K401 that is red-purple in ambient light and that fluoresces red-purple under UV light, each of which is available from Risk Reactor. Other examples include DFSB-K400 that has a brown appearance in ambient light and that fluoresces orange under excitation with UV light, DFSB-K427 that is orange under ambient light and under exposure to UV light, and DFSB-K43 that is yellow in ambient light and under exposure to activating UV light.

Quantum nanoparticle materials are fluorescent inorganic semiconductor nanoparticle materials (also known as quantum dots). The light emission of quantum nanoparticles is due to quantum confinement of electrons and holes. An advantage of quantum nanoparticles is that they can be tuned so that they emit any desired wavelength (color) as a function of their size, by using one material only and the same synthetic process. For example, in a nanoparticle size range of from about 2 to about 10 nm, one can obtain a full range of colors from the visible range of the spectrum. In addition, quantum nanoparticles possess improved fatigue resistance when compared with organic dyes. Another advantage of quantum nanoparticles is their narrow emission bands, which increases the number of possible wavelength choices for designing customized colors. Due to their small size, typically less than about 30 nm, such as less than about 20 nm, marking materials containing the nanoparticles can be easily jetted. Quantum nanoparticles are available from a variety of companies, such as from Evident Technologies.

In embodiments, the quantum nanoparticles used herein are functionalized quantum nanoparticles. Surface functionalized quantum nanoparticles may have better compatibility with the vehicles of the marking materials. Suitable functional groups present on the surface of the nanoparticles for compatibility with marking material vehicles may include long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatibilizing groups include polyesters, polyethers, polyamides, polycarbonates and the like.

An advantage in using quantum nanoparticles as the fluorescent material is that the encrypting codes can be readily customized for different users. As was discussed above, the use of code comprised of at least two differently colored or different color emitting marking materials represents a way of storing and hiding information in an electronic binary format and that cannot be copied or read (they are invisible to human eye) except by the intended user and the appropriate electronic reader. If the same encrypted technology is provided to all customers, the result would be that any customer possessing the same protective technology can read a document protected by another customer. This is unacceptable from a security-printing point of view. Customization of such code is possible by providing a different encoding/decoding and code-scrambling key for each customer, which is a software solution. This may work well, but like with any software, given enough time it can be counterfeited. Additional protection is needed particularly to protect sensitive important documents. The use of quantum nanoparticles as the fluorescent material provides a materials solution for providing customized codes and documents without the need for changing the key.

Thus, customized encrypted documents are provided by changing the color of the emitted light in the code for different users. Different users thus may have different color sets for their customized code, and their electronic readers are set to detect only their particular set of colors (wavelengths). As a result, even if a document falls into the wrong hands, it cannot be read or authenticated by that unauthorized user because that user would not have the necessary tuned reader to detect and read the emitted colors. Because the quantum nanoparticles typically have very narrow emission spectra, customization is possible for a large number of customers. In this way, there is no need for a change of the encryption key. However, when using the materials and software customizations together, the result can be a protection method that is virtually impossible to counterfeit since it has several layers of protection.

The materials solution to the protection method requires the capability of tuning the emitted colors of the fluorescent components over the entire spectrum. This is typically not possible with fluorescent organic dyes. With quantum nanoparticles, however, it is possible to tune to any color by changing the nanoparticle size, without changing the synthetic process or the materials. Any color in the visible spectrum can be achieved by varying the quantum nanoparticle size from about 2 nm to about 10 nm.

The marking materials containing quantum nanoparticles may be made to have very specific emission spectra. For example, the marking material may be made to have an emission range having a narrow full width half max emission range peak of about 30 nm or less, such as about 25 nm or less or about 20 nm or less. This permits the emitted color wavelength to be particularly tuned, and for the reader to be set to detect emissions at very specific and close together wavelengths. For example, the different wavelengths emitted by the fluorescent marking materials and detected by the reader may differ by, for example, about 20 nm to about 100 nm, such as about 30 nm to about 100 nm. These properties of quantum nanoparticles thus permit customization of the security markings described herein.

Even if a different key is used and the code is cracked, the electronic reader from one user can still not read a document encrypted by another user because it will not have the information on the emitted colors. Detection is thus performed by using a reader that is tuned to identify only specific emitted wavelengths.

Although similar results may be achieved through the use of different fluorescent organic dyes, with organic dyes only a limited number of emitted wavelengths can be achieved. Change of emitted color with organic fluorescent dyes requires change of the organic compound or substitution of the core molecule with appropriate functional groups. This is more difficult to achieve because of the potentially lengthy synthetic route.

As an example of customization, suppose that customer 1 protects their documents or packaging by two color emitting materials each containing quantum nanoparticles, one emitting red color (0s) and the other emitting blue color (1s). The detector provided by the document security provider reads only the wavelengths corresponding to the red and blue colors. Customer 2 protects their documents by using two color emitting materials each containing quantum nanoparticles, one emitting red color (0s) and the other emitting green color (1s). Their detector reads only these specified wavelengths. Customer 2 cannot read documents encrypted by customer 1 because their reader will not find one color (green), and similarly customer 1 cannot read documents encrypted by customer 2 because their reader will not read the color blue.

Thus, the advantages in using quantum nanoparticles as the fluorescent material include high encryption capability, the ability to provide any custom emitted color through simple size adjustment of the nanoparticles, the possibility of unlimited customization due to unlimited color combinations, cannot be copied, excellent fatigue resistance, the codes are difficult to counterfeit because of the very narrow emitted bands (organic dyes, for example, typically have a wider emission band), and quantum nanoparticles have excellent thermal stability and can be printed using existing ink jet or xerographic technology.

As the marking material vehicle, any ink or toner vehicles may be suitably used. For phase change solid inks, the vehicle may be any of those described in U.S. patent application Ser. No. 11/548,775, U.S. Pat. No. 6,906,118 and/or U.S. Pat. No. 5,122,187, each incorporated herein by reference in its entirety. The ink vehicle may also be radiation curable, for example any of the ink vehicles described in U.S. patent application Ser. No. 11/548,774, incorporated herein by reference in its entirety. The ink vehicle may also be any toner polymer binder, for example such as a polyester or a polyacrylate and the like.

The marking material vehicle may also include a wax such as paraffins, microcrystalline waxes, polyolefin waxes such as polyethylene or polypropylene waxes, ester waxes, fatty acids and other waxy materials, fatty amide containing materials, sulfonamide materials, resinous materials made from different natural sources (tall oil rosins and rosin esters, for example), and synthetic waxes. The wax may be present in an amount of from about 5% to about 25% by weight of the marking material. Examples of suitable waxes include polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. The commercially available polyethylenes selected usually possess a molecular weight of from about 1,000 to about 1,500, while the commercially available polypropylenes utilized for the toner compositions of the present invention are believed to have a molecular weight of from about 4,000 to about 5,000. Examples of suitable functionalized waxes include, for example, amines, amides, imides, esters, quaternary amines, carboxylic acids or acrylic polymer emulsion, for example JONCRYL™ 74, 89, 130, 537, and 538, all available from SC Johnson Wax, chlorinated polypropylenes and polyethylenes commercially available from Allied Chemical and Petrolite Corporation and SC Johnson wax.

The system for embedding and recovering the machine readable information on a substrate when using fluorescent marking materials comprises an image forming device containing at least one fluorescent marking material, wherein the image forming device receives data representative of the machine readable information, and forms an image corresponding to the data in a machine readable code format with the at least one fluorescent marking material on an image receiving substrate, and a document reading device including a radiation emitting unit that emits radiation effecting fluorescence of the at least one fluorescent marking material, and a reader that detects the data in the image on the mage receiving substrate while the at least one fluorescent marking material is fluorescing.

In addition, the system may include one or more processors, for example to convert information to the data representative of the information and/or machine readable code format, which data is received by the image forming device, and/or to convert the data detected by the reader to recover the encrypted information.

As the image forming device, an ink jet device, a xerographic device or other device for forming images with a marking material may be used. Suitable methods include, but are not limited to, electrostatic printing processes such as electrophotography and ionography, wherein an electrostatic latent image is formed and developed with the fluorescent marking material, either dry or liquid; ink jet printing processes, including both continuous stream processes and drop on demand processes (including piezoelectric, thermal or bubble jet, or the like), wherein droplets of an ink containing the fluorescent material are jetted in imagewise fashion onto the desired substrate; hot melt ink jet processes, wherein an ink containing the fluorescent material is solid at room temperature and liquid at elevated temperatures and wherein the ink is heated to a temperature above its melting point and jetted onto a substrate in an imagewise fashion; conventional printing processes, including lithographic and flexographic processes; and the like.

Printed images of machine readable code may thus be generated with the fluorescent marking materials described herein by incorporating the fluorescent marking material into an ink jet device, for example a thermal ink jet device, an acoustic ink jet device, a piezoelectric ink jet device and the like, and concurrently causing droplets of molten ink to be ejected in an imagewise pattern forming the code onto an image receiving substrate such as paper, cardboard, transparency material and the like. The ink is typically included in a reservoir connected by any suitable feeding device to the corresponding ejecting channels of an ink jet head. In the jetting procedure, the ink jet head may be heated, by any suitable method, to the jetting temperature of the ink.

In the ink jet device, several embodiments are possible. For example, in embodiments, the ink jet device may be made to jet only fluorescent marking materials. For example, a separate ink jet head exclusively for the fluorescent inks may be provided. The device may separately include additional print heads for providing images on the substrate with conventional marking inks. In other embodiments, the ink jet head may include separate channels for conventional inks and for the fluorescent inks, thereby permitting simultaneous printing of the image and the code.

In embodiments, the image forming device may also comprise both a xerographic device and an ink jet device. For example, the image forming device may include a xerographic device containing one or more non-fluorescent marking materials, and a separate ink jet device containing the at least one fluorescent marking material. The xerographic device can be used to form a reproduced image, while the ink jet device can print the encrypted information onto each document. Desirably, the ink jet device is downstream of the xerographic device in a process direction, so that the encrypted information is not overprinted by the xerographic device, but the ink jet device may also be upstream of the xerographic device.

The fluorescent marking material can be applied to any desired substrate. Examples of suitable substrates include (but are not limited to) plain papers such as XEROX® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like.

Specific embodiments will now be further indicated in the following illustrative examples. All parts and percentages are by weight unless otherwise indicated.

EXAMPLE 1

Solid ink compositions, containing a fluorescent dye, were prepared as follows:

Blue Emitting Composition:

A mass of 99 g of polyethylene wax base was added to a beaker and transferred to an oven at 140° C. for 3 hours. Upon melting, the beaker with ink base was transferred to a Griffin heating mantle and was mixed using an overhead stirrer at 175 RPM for 30 minutes. 1 g of a fluorescent compound (DFSB-CO (blue emitting fluorescent dye)) from Risk Reactor was added slowly to, while stirring, the ink base over 10 minutes. The solution was allowed to stir for another 2 hours, whereupon it was filtered through a 0.22 µm nylon filter in a 70 mm Mott filtration assembly at 135° C. The ink filtrate was poured into an aluminum dish and allowed to cool and solidify.

Red Emitting Composition:

A mass of 99 g of polyethylene wax base was mixed with 1 g of fluorescent dye DFKY-C7 (red emitting fluorescent dye) also from Risk Reactor. The composition was prepared by the procedure used in Example 1.

Dots were printed with a Phaser 8400 using each of the solid inks prepared as above. Under normal room light, the dots were invisible, but emitted the appropriate blue or red color under UV light.

EXAMPLE 2

UV Curable Ink Composition and Printing

Base Ink Composition:

A UV curable ink composition is fabricated by the following procedure: 1-[4-(2-hydroxyethoxy)-phenyl]-2-hydroxy-2-methyl-1-propane-1-one (2.5 g, photoinitiator commercially available as Ciba Irgacure 2959) is added to 47.5 g of a propoxylated neopentyl glycol diacrylate commercially available from Sartomer Co. Inc.). The mixture was stirred at 90° C. for 1 hour before allowing to cool to room temperature. A gellant may be used in the ink composition.

Composition with Blue Emitting Fluorescent Dye:

A 10 g batch of the U curable ink made as described above is mixed with 0.1 g of fluorescent compound DFSB-CO from Risk Reactor and stirred at room temperature for 2 hours to ensure dissolution of the fluorescent compound. Heating to 80° C. may be optionally used.

Composition with Red Emitting Fluorescent Dye:

A similar composition is prepared by using DFKY C7, a red emitting fluorescent dye from Risk Reactor.

Dots are made on paper by hand with a sharp syringe needle containing each of the two fluorescent UV curable compositions. After writing on a sheet, it is cured with UV light. The dots emit the appropriate colors upon UV curing, but the colors fade and the dots become invisible when left in ambient light.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A system for embedding and recovering machine readable information on an image receiving substrate, comprising:

an image forming device containing at least two fluorescent marking materials, wherein the at least two fluorescent marking materials comprise a first fluorescent marking material containing a first fluorescent material so that upon exposure to radiation effecting fluorescence of the first fluorescent material, the first fluorescent marking material exhibits a first visible color, and a second fluorescent marking material containing a second fluorescent material so that upon exposure to radiation effecting fluorescence of the second fluorescent material, the second fluorescent marking material exhibits a second visible color different from the first visible color, wherein the image forming device receives data representative of the machine readable information, and forms an image corresponding to the data in a machine readable code format with the first fluorescent marking material and/or second fluorescent marking material on the substrate, wherein the machine readable code format is comprised of a set of distinguishable symbols including a first symbol and a second symbol, the first symbol and the second symbol respectively encoding a first set of digital values comprised of a first digital value and a second digital value selected from the group consisting of zeroes and ones, on the substrate with the at least two fluorescent marking materials, wherein the distinguishable symbols are selected from a group consisting of glyphs and dots, wherein if the first digital value is a zero, the second digital value is a zero or a one, and if the first digital value is a one, the second digital value is a zero or a one, wherein the first visible color and the second visible color respectively encode a second set of digital values selected from the group consisting of zeroes and ones, wherein if the first visible color encodes a zero, the second visible color encodes a one, and if the first visible color encodes a one, the second visible color encodes a zero, wherein the first symbol is formed by one of either the first fluorescent material or the second fluorescent material and the second symbol is formed by the other of the first fluorescent material or the second fluorescent material. and a document reading device including a radiation emitting unit that emits radiation effecting fluorescence of the first fluorescent marking material and/or second fluorescent marking material, and a reader that detects the data in the image on the image receiving substrate while the first fluorescent marking material and/or second fluorescent marking material is fluorescing.

2. The system according to claim 1, wherein the system further comprises a processor that converts the machine readable information to the data representative of the machine readable information, which data is received by the image forming device.

3. The system according to claim 1, wherein the system further comprises a processor that converts the data detected by the reader to recover embedded information.

4. The system according to claim 1, wherein the image forming device is an ink jet device.

5. The system according to claim 4, wherein the ink jet device contains one or more non-fluorescent marking materials in addition to the at least two fluorescent marking materials.

6. The system according to claim 3, wherein the image forming device includes a xerographic device containing one or more non-fluorescent marking materials and a separate ink jet device containing the at least two fluorescent marking materials.

7. The system according to claim 6, wherein the ink jet device is downstream, in a process direction, of the xerographic device.

8. The system according to claim 1, wherein the reader comprises a spectrometer.

* * * * *